United States Patent
Wright

(10) Patent No.: US 10,524,418 B1
(45) Date of Patent: Jan. 7, 2020

(54) MOWER CUTTING DECK HAVING MULTIPLE DISCHARGE MODES

(71) Applicant: Excel Industries, Inc., Hesston, KS (US)

(72) Inventor: James Aaron Wright, Hesston, KS (US)

(73) Assignee: Excel Industries, Inc., Hesston, KS (US)

( * ) Notice: Subject to any disclaimer, the term of this patent is extended or adjusted under 35 U.S.C. 154(b) by 596 days.

(21) Appl. No.: 15/004,097

(22) Filed: Jan. 22, 2016

Related U.S. Application Data

(60) Provisional application No. 62/107,155, filed on Jan. 23, 2015.

(51) Int. Cl.

| | |
|---|---|
| *A01D 67/00* | (2006.01) |
| *A01D 34/71* | (2006.01) |
| *A01D 34/00* | (2006.01) |
| *A01D 34/81* | (2006.01) |
| *A01D 101/00* | (2006.01) |

(52) U.S. Cl.
CPC ........... *A01D 34/71* (2013.01); *A01D 34/005* (2013.01); *A01D 34/81* (2013.01); *A01D 2101/00* (2013.01)

(58) Field of Classification Search
CPC ...... A01D 34/71; A01D 34/005; A01D 34/81; A01D 2101/00
USPC .............................................. 56/320.1, 320.2
See application file for complete search history.

(56) References Cited

U.S. PATENT DOCUMENTS

| | | | |
|---|---|---|---|
| 3,818,687 A | 6/1974 | Houst et al. | |
| 4,226,074 A | 10/1980 | Mullet et al. | |
| 5,090,183 A | 2/1992 | Thorud et al. | |
| 5,133,176 A * | 7/1992 | Baumann ............ | A01D 34/005 56/17.4 |
| 5,205,112 A | 4/1993 | Tillotson et al. | |
| 5,305,589 A | 4/1994 | Rodriguez | |
| 5,465,564 A | 11/1995 | Koehn et al. | |
| 5,845,475 A | 12/1998 | Bushboom et al. | |
| 5,987,863 A | 11/1999 | Bushboom et al. | |
| 6,192,666 B1 | 2/2001 | Sugden et al. | |
| 6,330,783 B2 | 12/2001 | Oxley | |
| 6,470,663 B2 | 10/2002 | Langworthy et al. | |

(Continued)

OTHER PUBLICATIONS

1994 Excel Quad Cycle Brochure.

*Primary Examiner* — Thomas B Will
*Assistant Examiner* — Mai T Nguyen
(74) *Attorney, Agent, or Firm* — Robert O. Blinn

(57) ABSTRACT

A multi-blade lawnmower includes a cutting deck with generally adjacent cutting chambers. The cutting chambers each include a cutting blade. The cutting chambers have at least one of the following: (a) a side discharge opening and (b) a rear discharge opening. Each side discharge opening either communicates with the next cutting chamber or, as in the case of the last cutting chamber, discharges grass from side of the cutting deck. When a side discharge opening is present, a side discharge baffle plate is available for either blocking the side discharge opening or being stored in a non-blocking inactive position inside the cutting deck. When a rear discharge opening is present, a rear discharge baffle plate is available for either blocking the rear discharge opening or being stored within the cutting deck in non-blocking inactive position inside the cutting chamber.

5 Claims, 7 Drawing Sheets

(56) References Cited

U.S. PATENT DOCUMENTS

| | | | |
|---|---|---|---|
| 6,609,358 B1* | 8/2003 | Schmidt | A01D 42/005 56/320.2 |
| 7,093,415 B2 | 8/2006 | Kallevig et al. | |
| 7,146,791 B2* | 12/2006 | Benway | A01D 42/005 56/320.2 |
| 7,204,073 B1 | 4/2007 | Chenevert | |
| 7,555,887 B2* | 7/2009 | Schick | A01D 34/71 56/320.1 |
| 7,574,852 B1 | 8/2009 | Loxterkamp et al. | |
| 7,677,022 B2* | 3/2010 | Chenevert | A01D 42/005 56/320.1 |
| 7,866,135 B2 | 1/2011 | Davis et al. | |
| 8,132,396 B2 | 3/2012 | Minami et al. | |
| 8,156,722 B2 | 4/2012 | Sugio et al. | |
| 8,171,709 B1 | 5/2012 | Bedford et al. | |
| 2003/0154705 A1 | 8/2003 | Sugden et al. | |
| 2003/0217542 A1 | 11/2003 | Osborne | |
| 2004/0255567 A1 | 12/2004 | Kallevig | |
| 2006/0248869 A1* | 11/2006 | Chenevert | A01D 42/005 56/320.1 |
| 2007/0068132 A1 | 3/2007 | Chenevert | |
| 2007/0068133 A1* | 3/2007 | Kure | A01D 34/71 56/320.1 |
| 2007/0084176 A1 | 4/2007 | Chenevert | |
| 2008/0047249 A1* | 2/2008 | Davis | A01D 34/71 56/320.2 |
| 2008/0092509 A1 | 4/2008 | Imanishi | |

\* cited by examiner

MOWER CUTTING DECK HAVING MULTIPLE DISCHARGE MODES

RELATED APPLICATIONS

This application claims the benefit of U.S. Provisional Patent Application No. 62/107,155 filed on Jan. 23, 2015 which is incorporated herein by reference.

FIELD OF THE INVENTION

This invention relates to a mower cutting deck having a plurality of cutting chambers and baffles which may be secured in active positions and inactive positions in order to block or unblock discharge openings for various discharge modes.

BACKGROUND

Commercial landscape maintenance operators have a need for mowers with multiple cutting chambers. Further, landscape operators using multi-blade riding mowers tend to handle grass clippings in one of three modes: a side discharge mode, a rear discharge mode and a mulching mode. A side discharge mower is often utilized when clippings are being captured and moved off-site. A rear discharge mower may be utilized when the turf being cut is particularly thick, so that, it is advantageous to discharge grass clippings from all of the cutting chambers. Mulching works best when the depth of the cut is limited so that the remaining turf can accept finely chopped clippings without forming unsightly clumps and windrows. Because operators may encounter different requirements for cutting grass either with the same lawn or at multiple locations in the case of a professional operator, it would be advantageous to have a riding mower with multiple cutting chambers which is capable of operating in at least two of the above described modes.

SUMMARY

The above described need is addressed by one embodiment of a multi-blade lawnmower having at least two modes of operation. The multi-blade lawnmower includes a cutting deck with generally adjacent cutting chambers including at least a first chamber and a last chamber. The cutting chambers include spinning blades. All of the cutting chambers have at least one of the following discharge openings: (a) a side discharge opening and (b) a rear discharge opening. Each side discharge opening either communicates with an adjacent cutting chamber, or, as in the case of the last cutting chamber, discharges grass from side of the cutting deck through a side discharge opening. When a side discharge opening is present, a baffle plate is provided which is able to be secured in (a) an active positon for blocking the side discharge opening or (b) a non-blocking inactive position inside the mower deck. When a rear discharge opening is present, a baffle plate is provided which is able to be secured in (a) an active positon for blocking the rear discharge opening or (b) a non-blocking inactive position inside the mower deck.

DETAILED DESCRIPTION

Figure 1:
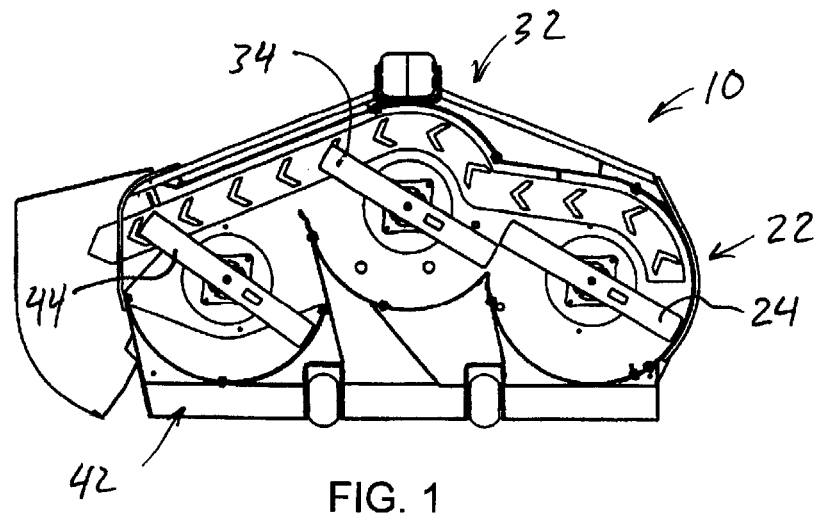
FIG. 1 is a bottom view of one embodiment of a multi-discharge mode cutting deck showing the flow of clippings when the cutting deck is configured in the side discharge mode.
Figure 2:
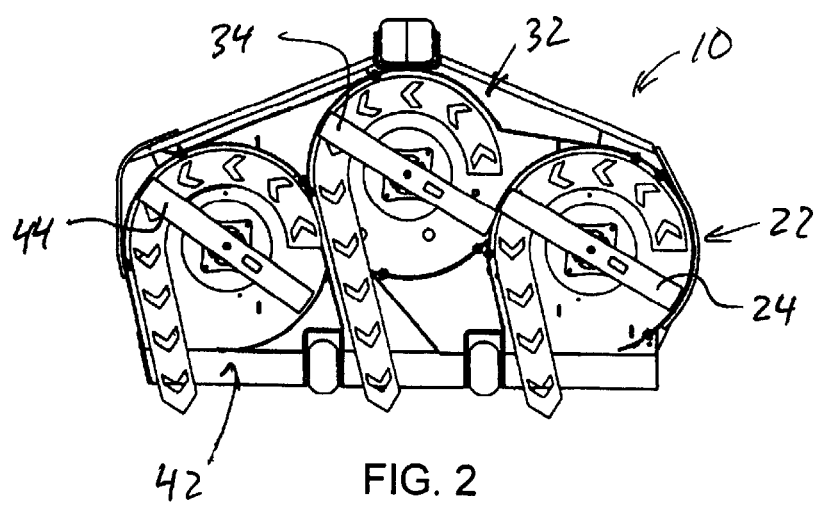
FIG. 2 is a bottom view of one embodiment of the multi-discharge mode cutting deck showing the flow of clippings when the cutting deck is configured in the rear discharge mode.
Figure 3:
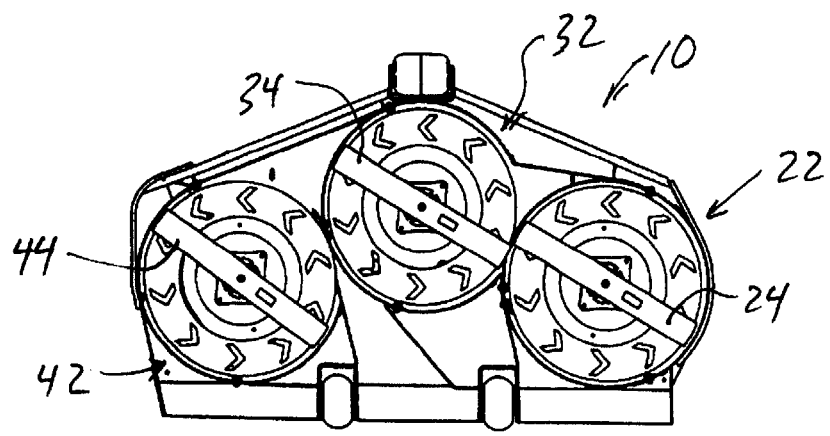
FIG. 3 is a bottom view of one embodiment of the multi-discharge mode cutting deck showing the flow of clippings when the cutting deck is configured in the mulching mode.

Referring to the drawings, FIGS. 1-3 show one embodiment of a multi-discharge mode cutting deck 10. All of the figures (FIGS. 1-16) generally show cutting deck 10 (and cutting decks 110 and 210) from below. As can be seen in FIGS. 1-3, cutting deck 10, in this embodiment, includes three cutting chambers, namely; a first cutting chamber 22, a second cutting chamber 32 and a third cutting chamber 42. In this embodiment, third cutting chamber 42 may also be known as the last cutting chamber. However, embodiments may be possible having only two cutting chambers or even more than three cutting chambers. In this example, first, second and third cutting chambers 22, 32 and 42 are each defined by inside walls including a top wall where a cutting blade is mounted and fixed side walls which are generally circular. The fixed side walls of the cutting chambers present side discharge openings and rear discharge openings which will be described in greater detail below. As will also be described in greater detail below, the side and rear discharge openings of each cutting chamber may be selectively blocked by baffle plates in order to arrange cutting deck 10, in this example, for one of three operational modes, namely, a side discharge mode, a rear discharge mode or a mulching mode.

As can be seen in FIGS. 1-12, in this example, second cutting chamber 32 is offset forward of first and third cutting chambers 22 and 42. As can be seen in FIGS. 1-12, a first cutting blade 24, a second cutting blade 34 and a third cutting blade 44 are disposed in first, second and third cutting chambers 22, 32 and 42 respectively. In this example, all three cutting blades are arranged to rotate in a counter-clockwise direction as viewed from the perspective of all of the figures. FIGS. 1-3 illustrate how grass clippings flow through the cutting chambers when configured for the various discharge modes. In FIG. 1, cutting deck 10 is arranged in a side discharge mode. Accordingly, grass clippings tend to flow from first cutting chamber 22 to second cutting chamber 32 and on to third cutting chamber 42 and finally out the side discharge opening 42A of third cutting chamber 42 (indicated in FIG. 4). In FIG. 2, deck 10 is arranged in a rear discharge mode. In the rear discharge mode, grass clippings tend to be discharged from each cutting deck through its respective rear discharge opening 22B, 32B or 42B (indicated in FIG. 5). In FIG. 3, cutting deck 10 is arranged in a mulching mode such that all of the discharge openings are blocked.

Figure 4:
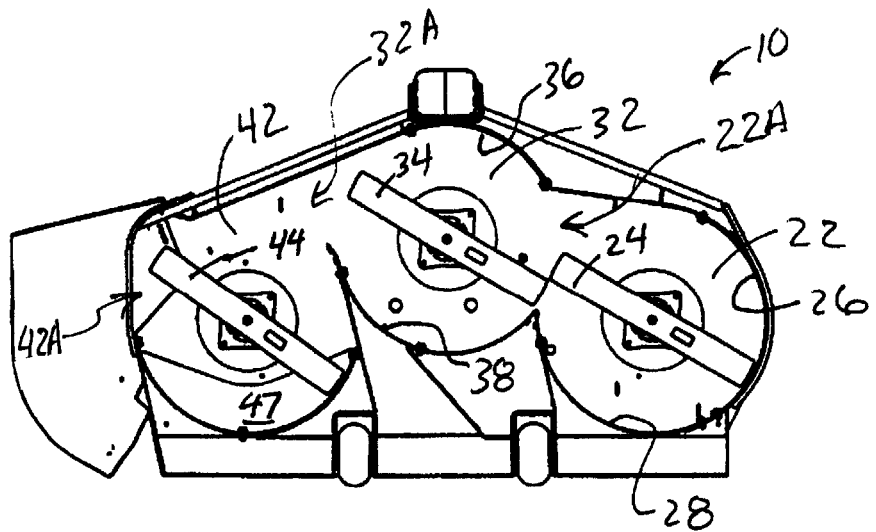
FIG. 4 is a bottom view of one embodiment of the multi-discharge mode cutting deck showing the configuration of the baffle plates when the cutting deck is configured in the side discharge mode.
Figure 5:
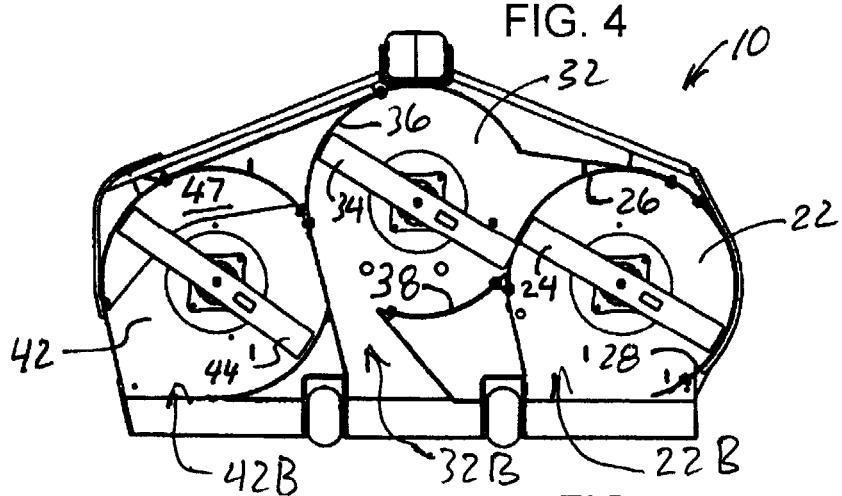
FIG. 5 is a bottom view of one embodiment of the multi-discharge mode cutting deck showing the configuration of the baffle plates when the cutting deck is configured in the rear discharge mode.
Figure 6:
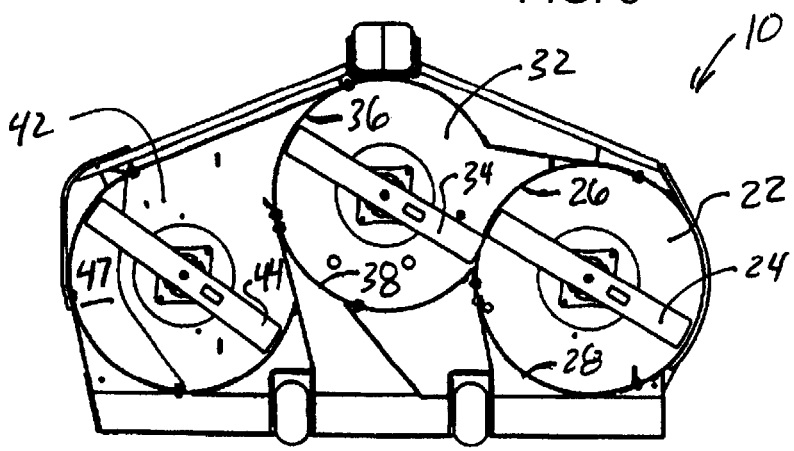
FIG. 6 is a bottom view of one embodiment of the multi-discharge mode cutting deck showing the configuration of the baffle plates when the cutting deck is configured in the mulching mode.

FIGS. 4-6 correspond to FIGS. 1-3. However, FIGS. 4-6 are intended to illustrate the placement of baffle plates needed to configure cutting deck 10 in each of the three configurations rather than to illustrate the general patterns of grass clipping flow in each of the three configurations as in FIGS. 1-3.

FIG. 6 shows the mulching configuration for cutting deck 10. As is shown in FIG. 6, cutting chamber 22 has a first forward baffle plate 26 and a first rear baffle plate 28. In FIG. 6, first forward baffle plate 26 is in an active position where it is blocking the flow of grass clippings from first cutting chamber 22 to second cutting chamber 32 through a first side discharge opening 22A (indicated in FIG. 4). Also in FIG. 6, first rear baffle plate 28 is in an active position where it is blocking the flow of grass clippings from first cutting chamber 22 through a first rear discharge opening 22B (indicated in FIG. 5). Accordingly, in FIG. 6, first cutting chamber 22 is arranged in a mulching configuration so that grass clippings are not discharged from first cutting chamber 22 through a side or rear discharge opening but are mulched and deposited under first cutting chamber 22 as cutting deck 10 moves across the turf. In this example, there is substantially no communication between adjacent cutting chambers when baffle plates 26 and 36 are in active positions as shown in FIG. 6. However, it is possible for a cutting deck to function in a mulching mode if openings are present between adjacent cutting chambers. By "substantially no communication" between adjacent cutting chambers, the applicant means that grass clippings are generally not able to flow in effective amounts between the adjacent cutting chambers.

In FIG. 6, second cutting chamber 32 is also arranged in a mulching configuration. In FIG. 6, in second cutting chamber 32, a second forward baffle plate 36 and a second rear baffle plate 38 are both in active positions blocking both a second side discharge opening 32A (indicated in FIG. 4) and a second rear discharge opening 32B (indicated in FIG. 5) respectively. Accordingly, grass clippings are not discharged from second cutting chamber 32 through a side or rear discharge opening but are mulched and deposited under second cutting chamber 32 as the cutting deck moves across the turf.

As can be seen in FIG. 6, third cutting chamber 42 has only one third cutting chamber baffle plate 47. Third cutting chamber baffle plate 47 is sufficiently extensive to block both a third side discharge opening 42A (indicated in FIG. 4) and a third rear discharge opening 42B (indicated in FIG. 5). Accordingly, when third cutting chamber baffle plate 47 is blocking both third side discharge opening 42 and third rear discharge opening 42B, grass clippings are not discharged from third cutting chamber 42 but are mulched and deposited under third cutting chamber 42 as the cutting deck moves across the turf.

Figure 11:
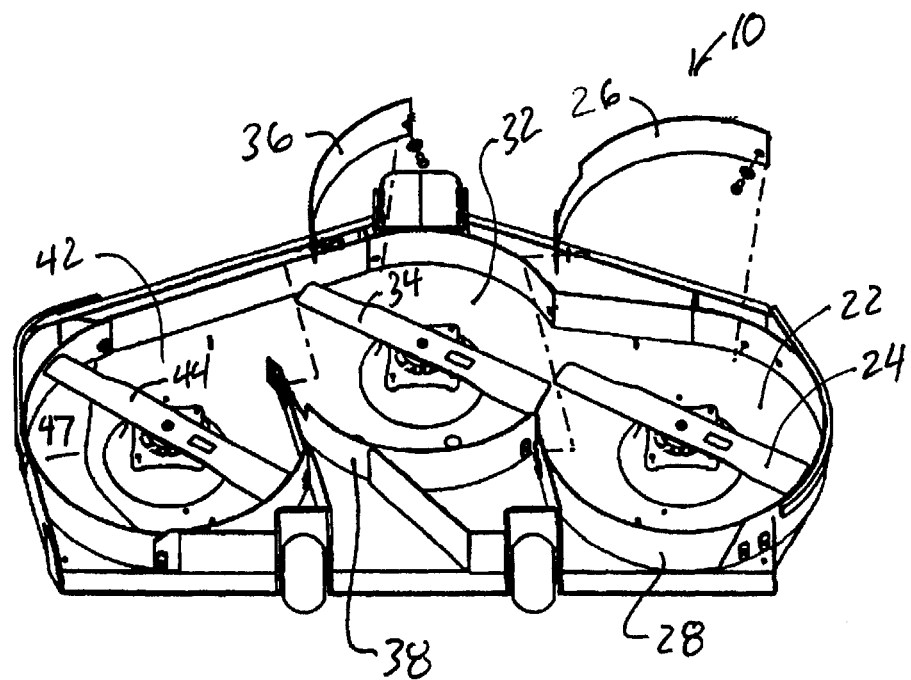
FIG. 11 is a bottom perspective view of one embodiment of the multi-discharge mode cutting deck showing the configuration of the baffle plates when the cutting deck is configured in the mulching mode showing the front baffle plates exploded away from the cutting deck and the rear baffle plates installed for the purpose of illustrating the configuration and placement of the front baffle plates when the cutting deck is in the mulching mode.
Figure 12:
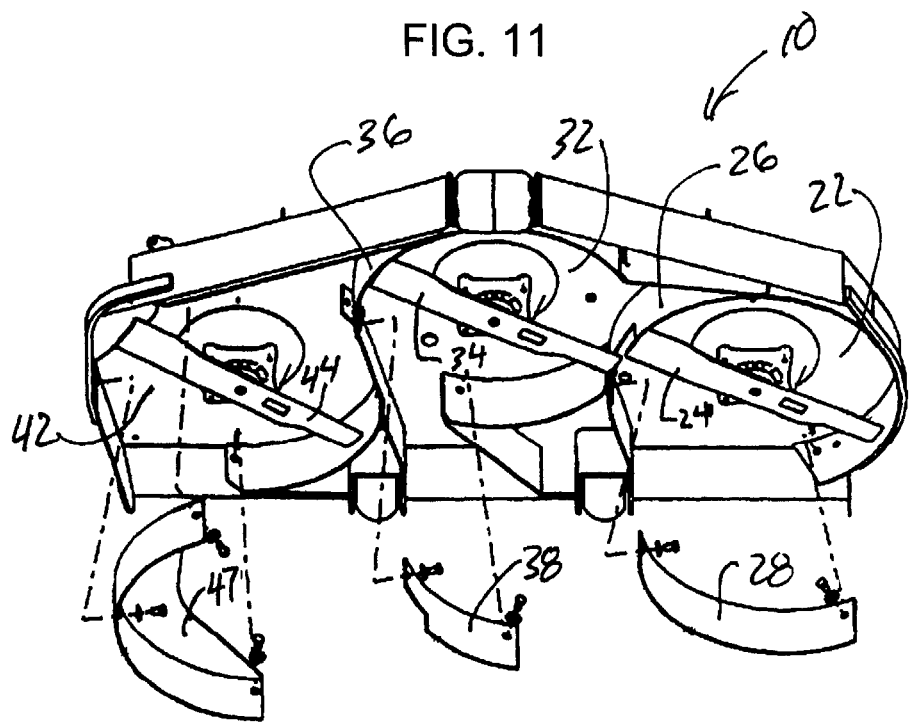
FIG. 12 is a bottom perspective view of one embodiment of the multi-discharge mode cutting deck showing the configuration of the baffle plates when the cutting deck is configured in the mulching mode showing the rear baffle plates exploded away from the cutting deck and the front baffle plates installed for the purpose of illustrating the configuration and placement of the front baffle plates when the cutting deck is in the mulching mode.

FIGS. 11 and 12 also show the mulching mode but alternate in showing exploded views of the first and second forward baffle plates 26 and 36 and first and second rear baffle plates 28 and 38 so that the reader may more easily visualize how baffle plates are installed for the mulching mode. In FIG. 11 first and second forward baffle plates 26 and 36 are exploded away from cutting deck 10 with rear baffle plates 28 and 38 and third cutting chamber baffle plate 47 not exploded. FIG. 12 shows the first and second rear baffle plates 28 and 38 and third cutting chamber baffle plate 47 exploded away from cutting deck 10 with first and second forward baffle plates 26 and 36 not exploded away from cutting deck 10.

In FIG. 4, the baffle plates are arranged for the side discharge mode. In first cutting chamber 22, first rear baffle plate 28 is blocking first rear discharge opening 22B (indicated in FIG. 5) and first forward baffle plate 26 is stored on the right side of cutting chamber 10 in an inactive position so as to not block first side discharge opening 22A which communicates between first cutting chamber 22 and second cutting chamber 32. When first side discharge opening 22A is not blocked, clippings are able to be transferred from first cutting chamber 22 to second cutting chamber 32. In second cutting chamber 32, second rear baffle plate 38 is also blocking that chamber's rear discharge opening 32B (indicated in FIG. 5) while second forward baffle plate 36 is also in a storage position to the right of second side discharge opening 32A. When second side discharge opening 32A is not blocked, clippings are able to be transferred from second cutting chamber 32 to third cutting chamber 42. Finally, in third cutting chamber 42, baffle plate 47 is rotated counterclockwise from the position shown in FIG. 6 so that baffle plate 47 is only blocking third rear discharge opening 42B (indicated in FIG. 5) while leaving third side discharge opening 42A unobstructed for the discharge of clippings from cutting deck 10. Thus, when in the side discharge mode, as shown in FIG. 1, grass clippings generated in a cutting chamber tend to be transferred to next cutting chamber and finally are discharged from third cutting chamber 42 through third side discharge opening 42A.

Figure 7:
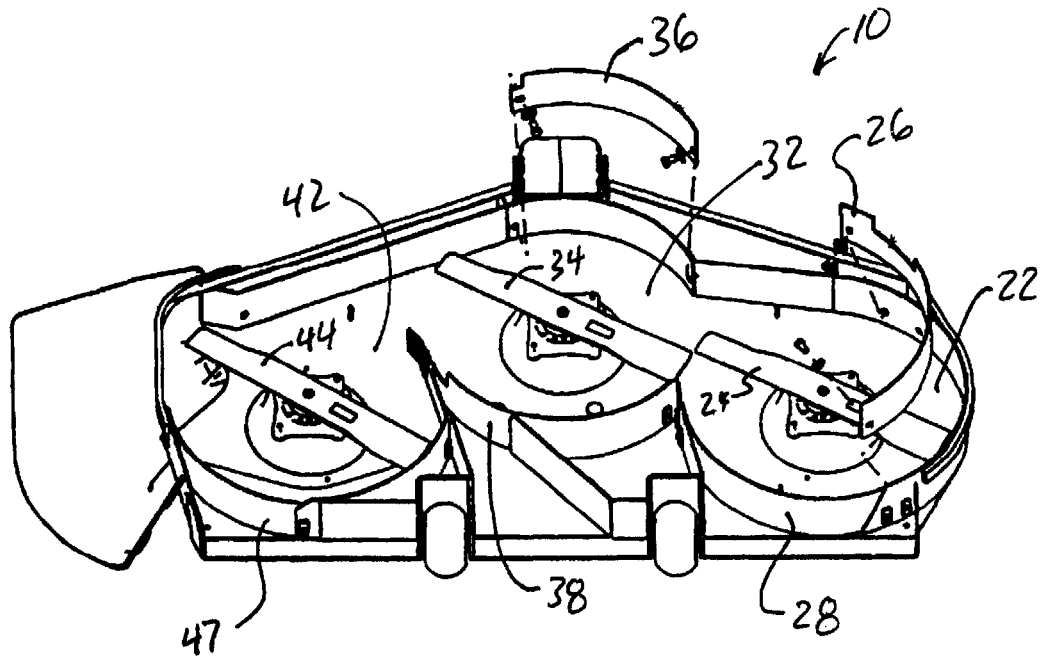
FIG. 7 is a bottom perspective view of one embodiment of the multi-discharge mode cutting deck showing the configuration of the baffle plates when the cutting deck is configured in the side discharge mode showing the front baffle plates exploded away from the cutting deck and the rear baffle plates installed for the purpose of illustrating the configuration and placement of the front baffle plates when the cutting deck is in the side discharge mode.
Figure 8:
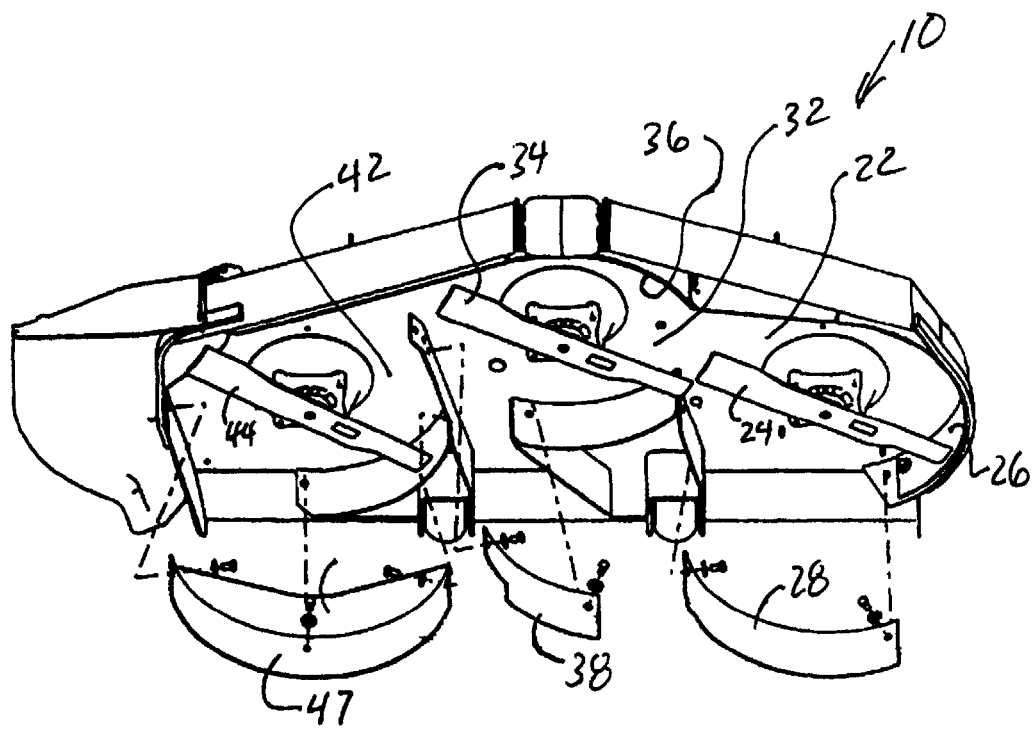
FIG. 8 is a bottom perspective view of one embodiment of the multi-discharge mode cutting deck showing the configuration of the baffle plates when the cutting deck is configured in the side discharge mode showing the rear baffle plates exploded away from the cutting deck and the front baffle plates installed for the purpose of illustrating the configuration and placement of the rear baffle plates when the cutting deck is in the side discharge mode.

FIGS. 7 and 8 also show the side discharge mode but alternate in showing exploded views of the forward and rear baffle plates so that the reader may more easily visualize the baffle plates and their locations for the side discharge mode. In FIG. 7, forward baffle plates 26 and 36 are exploded away from deck 10 with rear baffle plates 28 and 38 and third cutting chamber baffle plate 47 not exploded. FIG. 8 shows the rear baffle plates 28 and 38 and third cutting chamber baffle plate 47 exploded away from deck 10 with forward baffle plates 26 and 36 not exploded.

In FIG. 5, the baffle plates are arranged for the rear discharge mode. In first cutting chamber 22, first forward baffle plate 26 is blocking first side discharge opening 22A (as indicated in FIG. 4) and first rear baffle plate 28 is installed on the right side of first cutting chamber 22 in an inactive position to the right of first rear discharge opening 22B. In second cutting chamber 32, second forward baffle plate 36 is also blocking second side discharge opening 32A (indicated in FIG. 4) which leads to third cutting chamber 42 while second rear baffle plate 38 is also in a storage position to the right of the second rear discharge opening 32B thereby leaving second rear discharge opening 32B unobstructed. Finally, in third cutting chamber 42, third cutting chamber baffle plate 47 is rotated clockwise from the position shown in FIG. 6 so that third cutting chamber baffle plate 47 is only blocking third side discharge opening 42A (indicated in FIG. 4) and is not blocking third rear discharge opening 42B (indicated in FIG. 5). Accordingly, first, second and third side discharge openings 22A, 32A and 42A are blocked while first, second and third rear discharge openings 22B, 32B and 42B are unobstructed thereby allowing grass clippings to be discharged to rear of cutting deck 10.

Figure 9:
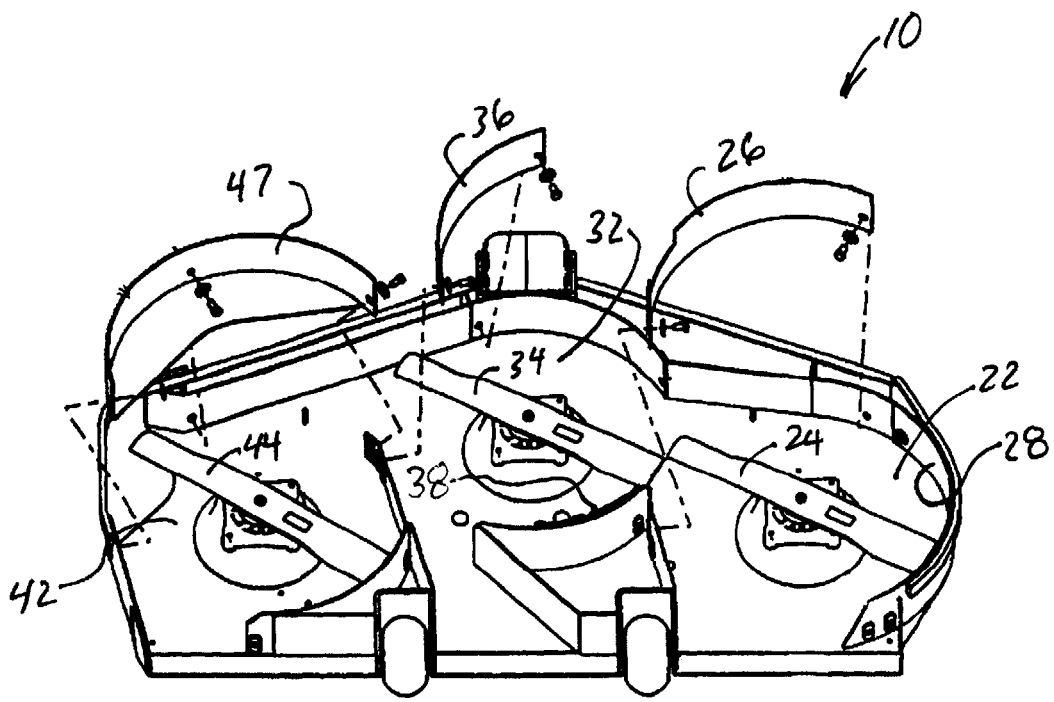
FIG. 9 is a bottom perspective view of one embodiment of the multi-discharge mode cutting deck showing the configuration of the baffle plates when the cutting deck is configured in the rear discharge mode showing the front baffle plates exploded away from the cutting deck and the rear baffle plates installed for the purpose of illustrating the configuration and placement of the front baffle plates when the cutting deck is in the rear discharge mode.
Figure 10:
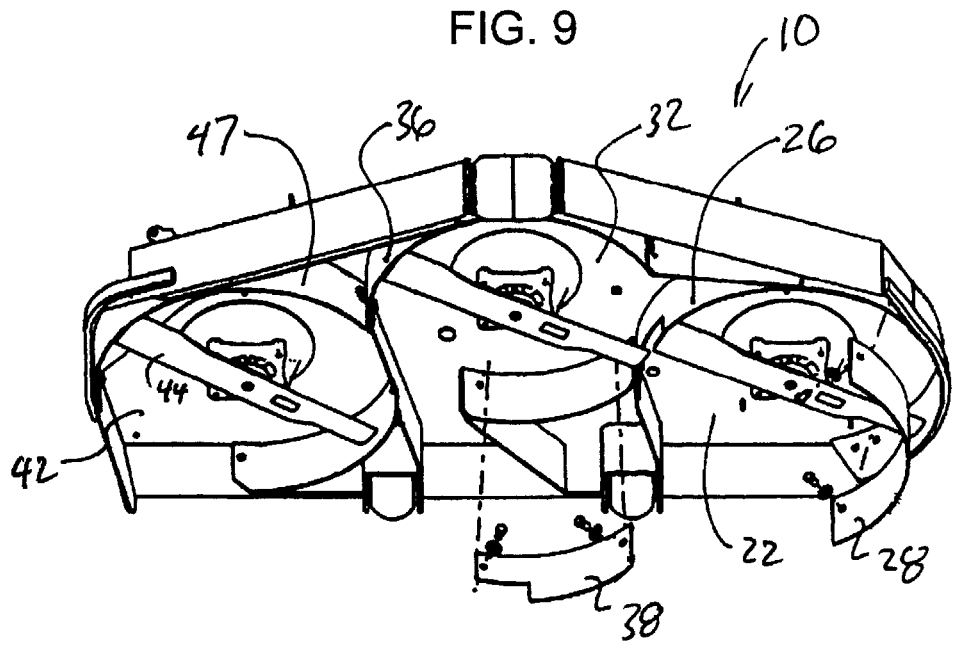
FIG. 10 is a bottom perspective view of one embodiment of the multi-discharge mode cutting deck showing the configuration of the baffle plates when the cutting deck is configured in the rear discharge mode showing the rear baffle plates exploded away from the cutting deck and the front baffle plates installed for the purpose of illustrating the configuration and placement of the rear baffle plates when the cutting deck is in the rear discharge mode.

FIGS. 9 and 10 also show the rear discharge mode but alternate in showing exploded views of the forward and rear baffle plates so that the skilled reader may more easily visualize the baffle plates and their locations for the rear discharge mode. In FIG. 9, first and second forward baffle plates 26 and 36 as well as third cutting chamber baffle plate 47 are exploded away from deck 10. In FIG. 9, first rear baffle plate 28 is not shown to be exploded from cutting deck 10 but rather secured in the inactive position in cutting chamber 22. Second rear baffle plate 38 is shown to be secured in the inactive position in cutting chamber 32 in FIG. 9 but only a portion of the lower edge of rear baffle plate 38 can be seen in FIG. 9. FIG. 10 shows cutting deck 10 with first and second rear baffle plates 28 and 38 exploded away from cutting deck 10 and with first and second forward baffle plates 26 and 36 as well as third cutting chamber baffle plate 47 secured in active positions and not exploded from cutting deck 10.

Figure 13:
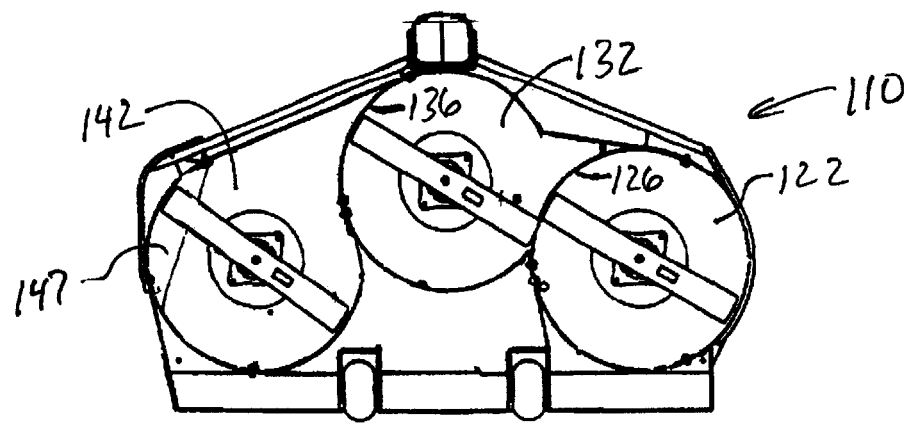
FIG. 13 is a bottom view of a second embodiment of the multi-discharge mode cutting deck which is adapted to support a mulching mode and a side discharge mode showing the configuration of the baffle plates when the second embodiment cutting deck is configured in the mulching mode.
Figure 14:
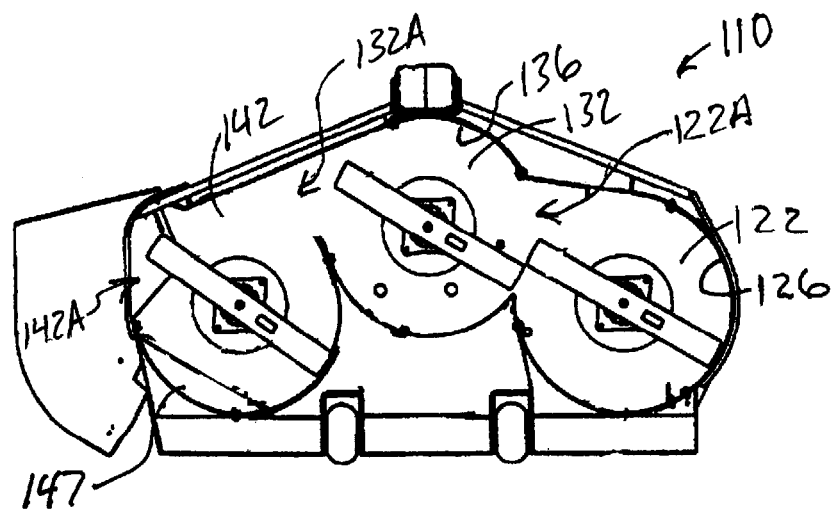
FIG. 14 is a bottom view of the second embodiment cutting deck showing the configuration of the baffle plates when the second embodiment cutting deck is configured in the side discharge mode.

FIGS. 13 and 14 illustrate a second embodiment of a multi-mode cutting deck 110 which supports a mulching mode as shown in FIG. 13 and a side discharge mode as shown in FIG. 14. Cutting deck 110 does not have rear discharge openings. As can be seen in FIGS. 13 and 14, second cutting deck 110 includes a first cutting chamber 122, a second cutting chamber 132 and a third cutting chamber 142. The cutting blades have been omitted for clarity. As shown in FIG. 14, first cutting chamber 122 has a first side discharge opening 122A which connects with second cutting chamber 132. Second cutting chamber has a second side discharge opening 132A which connects with third cutting chamber 142. Third cutting chamber 142 has a third side discharge opening 142A which opens a portion of the side of cutting deck 110 for the discharge of grass clipping from cutting deck 110.

FIG. 13 illustrates cutting deck 110 in the mulching configuration. In FIG. 13, a first baffle plate 126 is secured in first cutting chamber 122 to block first side discharge opening 122A, a second baffle plate 136 is secured in second cutting chamber 132 to block second side discharge opening 132A and a third baffle plate 147 is secured in third cutting chamber 142 to block third side discharge opening 142A. In this example, there is substantially no communication between adjacent cutting chambers when baffle plates 126 and 136 are in active positions as shown in FIG. 13. However, it is possible for a cutting deck to function in a mulching mode if openings are present between adjacent cutting chambers.

FIG. 14 illustrates cutting deck 110 in the side discharge configuration. In FIG. 14, first baffle plate 126 is secured in first cutting chamber 122 in an inactive, storage location within cutting chamber 122 such that first baffle plate 126 does not obstruct first side discharge opening 122A. Similarly, second baffle plate 136 is also secured in an inactive storage location within second cutting chamber 132 where it does not obstruct discharge opening 132A. In the same way, third baffle plate 147 is secured within third cutting chamber 142 so that third side discharge opening 142A is not blocked.

Figure 15:
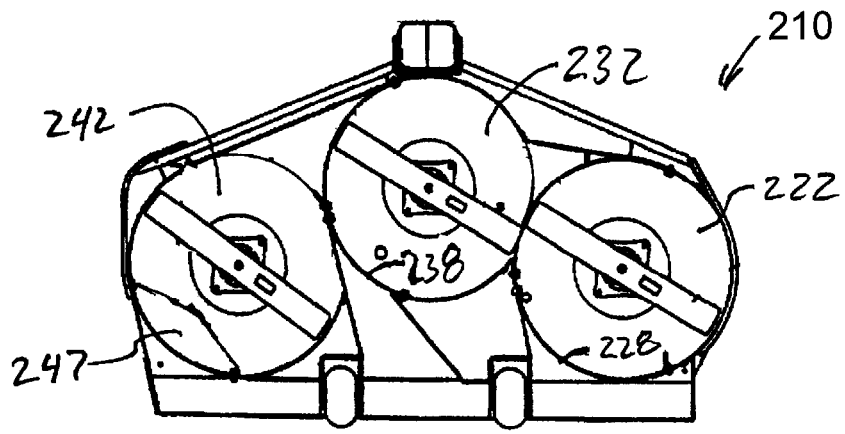
FIG. 15 is a bottom view of a third embodiment of the multi-discharge mode cutting deck which is adapted to support a mulching mode and a rear discharge mode showing the configuration of the baffle plates when the third embodiment cutting deck is configured in the mulching mode.
Figure 16:
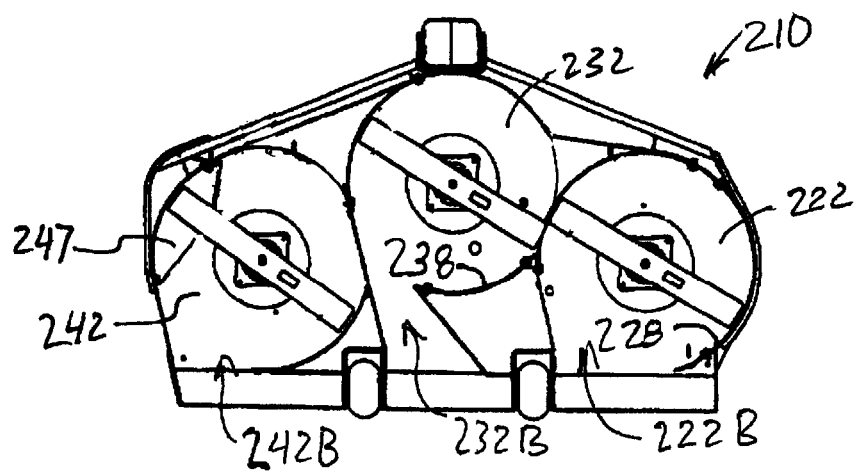
FIG. 16 is a bottom view of the third embodiment cutting deck showing the configuration of the baffle plates when the third embodiment cutting deck is configured in the rear discharge mode.

FIGS. 15 and 16 illustrate a third embodiment of a multi-mode cutting deck 210 which supports a mulching mode as shown in FIG. 15 and a rear discharge mode as shown in FIG. 16. Cutting deck 210 does not have side discharge openings. As can be seen in FIGS. 15 and 16, third cutting deck 210 includes a first cutting chamber 222, a second cutting chamber 232 and a third cutting chamber 242. As shown in FIG. 16, first, second and third cutting chambers 222, 232 and 242 each have a first, second and third rear discharge opening 222B, 232B and 242B respectively.

FIG. 15 illustrates cutting deck 210 in the mulching configuration. In FIG. 15, a first baffle plate 228 is secured in first cutting chamber 222 to block first rear discharge opening 222B, a second baffle plate 238 is secured in second cutting chamber 232 to block second rear discharge opening 232B and a third baffle plate 247 is secured in third cutting chamber 242 to block third rear discharge opening 242B. In this example, there is substantially no communication between adjacent cutting chambers when cutting deck 210 is in the mulching configuration. However, it is possible for a cutting deck to function in a mulching mode if openings are present between adjacent cutting chambers.

FIG. 16 illustrates cutting deck 210 in the rear discharge configuration. In FIG. 16, first baffle plate 228 is secured in first cutting chamber 222 in a non-active, storage location within cutting chamber 222 such that first baffle plate 228 does not obstruct first rear discharge opening 222B. Similarly, second baffle plate 238 is also secured in an inactive location within second cutting chamber 232 thereby opening second rear discharge opening 232B. In the same way, third baffle plate 247 is secured within third cutting chamber 242 so that third rear discharge opening 242B is not blocked.

An important aspect of cutting decks 10, 110 and 210 is best appreciated by referring to FIGS. 7-12. It is an important design feature that the baffle plates are stored within cutting deck 10 if and when they are not in use, that is, when they are in an inactive position. With this approach, it is very unlikely an operator will misplace a baffle plate. It is preferable that cutting decks 10, 110 and 210 have nutplates (or fastener receiving elements or portions) at the various fastener locations needed to install the above described baffle plates at the above described active and inactive locations. The fasteners used to fasten the baffle plates at the various active and inactive locations may be loose fasteners or may be fasteners which are captive to the baffle plates. Moreover, the skilled reader may envision other ways to secure baffle plates in active or inactive positions within cutting decks 10, 110 or 210, including, for example, clips, latches or even magnets. A baffle system which is arranged so that a baffle plate is securely stored within the cutting deck when in the baffle plate is not being used is especially helpful for preventing the misplacement and loss of baffle plates when commercial operators are transporting mowers between work locations.

From the above description the skilled reader can see how cutting deck 10 provides a way to cut grass with up to three different modes of operation. If this configuration is combined with an easily accessible flip-up deck structure, an operator may alternate between the various modes as describe above and may do so quickly and easily. An operator may also be able to do so without hand tools.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A lawnmower, comprising:
   a cutting deck including a plurality of cutting chambers that are arranged next to each other and include at least a first cutting chamber and a last cutting chamber, each cutting chamber having a cutting blade,
   each cutting chamber having a side discharge opening and a rear discharge opening, the side discharge openings of the cutting chambers other than the last cutting chamber arranged to communicate with the next cutting chamber,
   each cutting chamber other than the last cutting chamber having a forward baffle plate and a rear baffle plate, each forward baffle plate and the cutting deck arranged such that the forward baffle plate may be secured in an active position suitable for blocking the side discharge opening of the cutting chamber or secured inside the cutting deck in an inactive position such that the side discharge opening is not blocked, each rear baffle plate and the cutting deck arranged such that the rear baffle plate may be secured in an active position suitable for blocking the rear discharge opening of the cutting chamber or secured inside the cutting deck in an inactive position such that the rear discharge opening is not blocked, and,
   the last cutting chamber having a baffle plate that is able to be secured in a rear discharge position wherein the baffle plate blocks the side discharge opening of the last cutting chamber and does not block the rear discharge opening of the last cutting chamber, a side discharge position wherein the baffle plate blocks the rear discharge opening of the last cutting chamber and does not block the side discharge opening of the last cutting chamber and a mulching position wherein the baffle plate blocks both the side and rear discharge openings,
   whereby the baffle plates of the cutting chambers may be arranged for one of three cutting modes, namely (a) a rear discharge mode wherein the side discharge openings of the cutting chambers are blocked and the rear discharge openings are not blocked, (b) a side discharge mode wherein the side discharge openings of the cutting chambers are not blocked and the rear discharge openings are blocked, and, (c) a mulching mode wherein the side and rear discharge openings of the cutting chambers are blocked.

2. A multi-blade lawnmower, comprising:
   a cutting deck having adjacent cutting chambers-including at least a first cutting chamber and a last cutting chamber, each cutting chamber being defined by inside walls including side walls and each cutting chamber including a cutting blade with all of the cutting blades arranged to rotate in the same direction,
   the side walls of each cutting chamber presenting a side discharge opening which either communicates with the next cutting chamber or, which, in the case of the last cutting chamber, is arranged to discharge grass clippings from one side of the cutting deck,
   the side walls of each cutting chamber also presenting a rear discharge opening for discharging grass clippings to the rear of each cutting chamber,
   each cutting chamber includes at least one baffle plate, the at least one baffle plate being able to be selectively secured in each cutting chamber for one of the following modes: (a) a rear discharge mode wherein the at least one baffle plate of each cutting chamber is secured in a position suitable for blocking the side discharge opening of each cutting chamber while leaving the rear discharge opening open, (b) a side discharge mode wherein the at least one baffle plate of each cutting chamber is secured in a position suitable for blocking the rear discharge opening of each cutting chamber while leaving the side discharge opening open, and, (c) a mulching mode wherein the at least one baffle plate of each cutting chamber is secured in a position suitable for blocking both the side discharge and rear discharge openings of each cutting chamber,
   wherein at least one of the cutting chambers has a forward baffle plate and a rear baffle plate, the forward baffle plate being able to be secured within the cutting deck in two positions, a first active position wherein the forward baffle plate blocks the side discharge opening of the cutting chamber and a second inactive positon wherein the forward baffle plate does not block the side discharge opening of the cutting chamber, the rear baffle plate also being able to be secured within the cutting deck in two positions, a first active position wherein the rear baffle plate blocks the rear discharge opening of the cutting chamber and a second inactive positon wherein the rear baffle plate does not block the rear discharge opening of the cutting chamber, and, wherein the last cutting chamber has one baffle plate that is able to be secured in a first position suitable for blocking the side discharge opening of the last cutting chamber while not blocking the rear discharge opening, a second position suitable for blocking the rear discharge opening while not blocking the side discharge opening and a third position suitable for blocking both the side and rear discharge openings.

3. A multi-blade lawnmower, comprising:

a cutting deck having adjacent cutting chambers including a first cutting chamber, a second cutting chamber and a third cutting chamber which are defined by inside walls including side walls, each cutting chamber having a cutting blade with all of the cutting blades being able to be powered to rotate in the same direction, the side walls of each cutting chamber presenting a side discharge opening which either communicates with the next cutting chamber or, in the case of the third cutting chamber, discharges grass clippings from the cutting deck, the side walls of each cutting chamber also presenting a rear discharge opening for discharging grass clippings to the rear of each cutting chamber, the first and second cutting chambers each including a forward baffle plate and a rear baffle plate, each forward baffle plate being able to be secured in an active position within its respective cutting chamber to block the side discharge opening of its respective cutting chamber or in an inactive position within the cutting deck such that the forward baffle plate does not block a side discharge opening of a cutting chamber, each rear baffle plate being able to be secured in an active position within its respective cutting chamber such that the rear baffle plate blocks the rear discharge opening of its respective cutting chamber or in an inactive position within the cutting deck such that the rear baffle plate does not block a rear discharge opening of a cutting chamber, the third cutting chamber including a third cutting chamber baffle plate which is able to be secured in a first active position within the third cutting chamber wherein the third cutting chamber baffle plate blocks the rear discharge opening and does not block the side discharge opening, a second active positon within the third cutting chamber wherein the third cutting chamber baffle plate blocks the side discharge opening and does not block the rear discharge opening, and a third active position within the third cutting chamber wherein the third chamber baffle plate blocks both the side discharge opening and the rear discharge opening, whereby the cutting deck may be configured in one of three modes; (a) a side discharge mode by securing the forward baffle plates in their respective inactive positions thereby not blocking the side discharge openings of the first and second cutting chambers, by securing the rear baffle plates in their respective active positions thereby blocking the rear discharge openings of the first and second cutting chambers and by securing the third cutting chamber baffle plate in the first active position thereby blocking only the rear discharge opening of the third cutting chamber while not blocking the side discharge opening of the third cutting chamber, (b) a rear discharge mode by securing the forward baffle plates in their respective active positions thereby blocking the side discharge openings of the first and second cutting chambers, by securing the rear baffle plates in their respective inactive positions thereby not blocking the rear discharge openings of the first and second cutting chambers and by securing the third cutting chamber baffle plate in the second active position thereby blocking only the side discharge opening of the third cutting chamber while not blocking the rear discharge opening of the third cutting chamber, and (c) a mulching mode wherein the forward baffle plates and the rear baffle plates of the first and second cutting chambers are secured in their respective active positions thereby blocking the side and rear discharge openings of the first and second cutting chambers and wherein the third cutting chamber baffle plate is secured in the third active position thereby blocking both the side and rear discharge openings of the third cutting chamber.

4. The multi-blade lawnmower of claim 3, wherein;

there is substantially no communication between adjacent cutting chambers when the cutting deck is in the mulching mode.

5. The multi-blade lawnmower of claim 3, wherein;

the baffle plates are secured in their respective active and inactive positions by fasteners that are received by nutplates that are mounted to the side walls of the cutting chambers.

* * * * *